United States Patent
West et al.

(10) Patent No.: US 8,635,103 B1
(45) Date of Patent: Jan. 21, 2014

(54) CONTEXTUAL TARGETING PREDICTION

(75) Inventors: Gregory S. West, Kirkland, WA (US);
Leon Chih Wen Wong, Seattle, WA (US); Matthew C. Cary, Seattle, WA (US)

(73) Assignee: Google Inc., Mountain View, CA (US)

( * ) Notice: Subject to any disclaimer, the term of this patent is extended or adjusted under 35 U.S.C. 154(b) by 1152 days.

(21) Appl. No.: 12/046,200

(22) Filed: Mar. 11, 2008

(51) Int. Cl.
*G06Q 40/00* (2012.01)

(52) U.S. Cl.
USPC ............... 705/14.4; 705/14.41; 705/14.43; 705/14.45; 705/14.49; 705/14.71

(58) Field of Classification Search
USPC ............. 705/14, 14.4, 14.41, 14.43, 14.45, 705/14.49, 14.71, 14.73
See application file for complete search history.

(56) References Cited

U.S. PATENT DOCUMENTS

| | | | |
|---|---|---|---|
| 7,844,605 B2 * | 11/2010 | Koran | 707/732 |
| 7,856,445 B2 * | 12/2010 | Gross | 707/771 |
| 8,117,050 B2 * | 2/2012 | Li et al. | 705/4 |
| 8,175,950 B1 * | 5/2012 | Grebeck et al. | 705/36 R |
| 2001/0014868 A1 * | 8/2001 | Herz et al. | 705/14 |
| 2004/0267725 A1 * | 12/2004 | Harik | 707/3 |
| 2006/0190336 A1 * | 8/2006 | Pisaris-Henderson et al. | 705/14 |
| 2007/0073579 A1 * | 3/2007 | Immorlica et al. | 705/14 |
| 2008/0208731 A1 * | 8/2008 | Ruckart | 705/37 |
| 2008/0270223 A1 * | 10/2008 | Collins et al. | 705/10 |
| 2009/0043593 A1 * | 2/2009 | Herbrich et al. | 705/1 |
| 2010/0087545 A1 * | 4/2010 | Beutler et al. | 514/655 |
| 2011/0087545 A1 * | 4/2011 | Gross | 705/14.49 |

* cited by examiner

*Primary Examiner* — Thomas M Hammond, III
*Assistant Examiner* — Kevin Poe
(74) *Attorney, Agent, or Firm* — Fish & Richardson P.C.

(57) ABSTRACT

Methods, systems, and apparatus, including computer program products, in which one or more webpages are identified based on one or more signals associated with an advertisement, a content of each of the webpages, and a property associated with the advertisement, and a performance measure is determined for the advertisement for each of the webpages. An auction score is calculated for the advertisement for each of the webpages based on the performance measure and a bid associated with the advertisement.

11 Claims, 4 Drawing Sheets

CONTEXTUAL TARGETING PREDICTION

BACKGROUND

This document relates to information presentation.

The rise of the Internet has enabled access to a wide variety of content items, e.g., video and/or audio files, webpages for particular subjects, news articles, etc. Such access to these content items has likewise enabled opportunities for targeted advertising. One form of online advertising is advertisement syndication, which allows advertisers to extend their marketing reach by distributing advertisements to additional partners. For example, third party online publishers can place an advertiser's text or image advertisements on webpages that have content related to the advertisement. As the users are likely interested in the particular content on the publisher webpage, they are also likely to be interested in the product or service featured in the advertisement. Accordingly, such targeted advertisement placement can help drive online customers to the advertiser's webpage.

The development of the advertisements by the advertiser can be optimized by evaluating how an advertisement would perform across the publishers' webpages before the advertisement has actually been placed on the webpages.

SUMMARY

In general, one aspect of the subject matter described in this specification can be embodied in a method for calculating auction scores for advertisements. One or more webpages can be identified based on one or more signals associated with an advertisement, a content of each of the webpages, and a property associated with the advertisement. A performance measure for the advertisement for each of the webpages can be determined, and an auction score can be calculated for the advertisement for each of the webpages based on the performance measure and a bid associated with the advertisement. Other embodiments of this aspect include corresponding methods, apparatus, and computer program products.

Another aspect of the subject matter described in this specification can be embodied in a method for calculating auction scores for advertisements. An advertisement is received, wherein the advertisement is associated with one or more signals and a bid. One or more publications are identified based on the one or more signals, and a performance measure is predicted for the advertisement for each of the one or more publications. An auction score is calculated based on the performance measure and the bid. Other embodiments of this aspect include corresponding methods, apparatus, and computer program products.

These various optional advantages and features can be separately realized and need not be present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
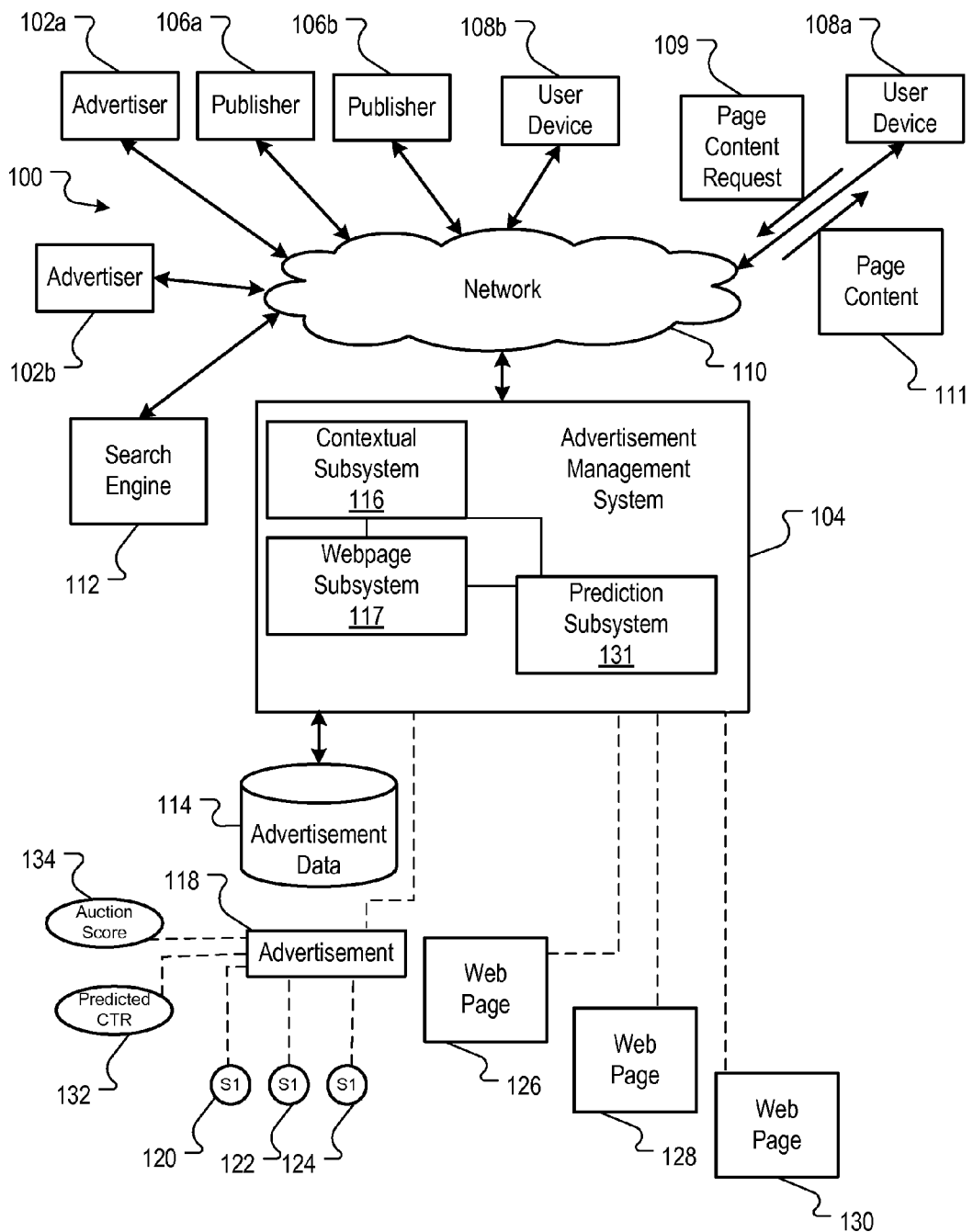
FIG. 1 is a block diagram of an example online environment.

FIG. 1 is a block diagram of an example online environment 100. The online environment 100 can facilitate the identification and serving of content items, e.g., webpages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only two advertisers (102a and 102b), two publishers (102a and 102b) and two user devices (108a and 108b) are shown, the online environment 100 may include many thousands of advertisers, publishers and user devices.

§1. Advertisement Publishing and Tracking

In some implementations, one or more advertisers 102a and/or 102b can directly, or indirectly, enter, maintain, and track content item information in the advertising management system 104. One form of a content item is an advertisement. Other forms of content items can include video files, image files, and audio files. While the description below refers to advertisements, other forms of content items can also be used. The advertisements can be in the form of graphical advertisements, such as banner advertisements, text only advertisements, image advertisements, audio advertisements, video advertisements, advertisements combining one or more of any of such components, etc., or any other type of electronic advertisement document 120. The advertisements may also include embedded information, such as a links, meta-information, and/or machine executable instructions, such as HTML or JavaScript™

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisements can also be provided from the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., webpages and other network-distributed content). The advertisements can include embedding links to landing pages, e.g., pages on the advertisers' 102 webpages, that a user is directed to when the user clicks an advertisement presented on a publisher webpage. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 111 and advertisements can be sent to the user device 108 that requested the content (e.g., user device 108*a*) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™)

Publishers 106*a* and 106*b* can include general content servers that receive requests for content (e.g., articles, discussion threads, advertisements, music, video, graphics, search results, webpage listings, information feeds, etc.), and retrieves the requested content in response to the request. For example, content servers related to news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of webpages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of webpage titles, snippets of text extracted from those webpages, and hypertext links to those webpages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., webpages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of clicks on the content item, e.g., a link to a landing page, an advertisement, or a search result, by the number of times the content item was delivered. For example, if a link to a content item is delivered 100 times, and the content item was clicked on 3 times, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's webpage, and consummates a purchase there before leaving that webpage. A conversion can also be defined by an advertiser to be any measurable/observable user action such as, for example, downloading a white paper, navigating to at least a given depth of a Webpage, viewing at least a certain number of Webpages, spending at least a predetermined amount of time on a Webpage or Webpages, registering on a Webpage, etc. Other actions that constitute a conversion can also be used.

§2. Advertisement Auctioning and Management

In addition to the advertisements being selected based on content such as a search query or webpage content of a publisher, the advertisements can also be selected from an auction. In one implementation, the advertisement management system 104 includes an auction process. Advertisers 102 may be permitted to select, or bid, an amount the advertisers are willing to pay for each presentation, interaction or other action (e.g., click of an advertisement) associated with the presentation of an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The rank of an advertisement that is displayed can be determined by, for example, multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

Rank=quality score×maximum cost-per-click=3.0× $0.50=1.50    A:

Rank=quality score×maximum cost-per-click=1.0×$ 0.75=0.75    B:

Rank=quality score×maximum cost-per-click=1.0×$ 1.00=1.00    C:

The advertisers can be ranked as follows:
1. A
2. C
3. B

An advertisement can also be associated with an actual cost-per-click. The actual cost-per-click of the advertisement can be determined by, for example, the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

C's rank/A's quality score=1.0/3=$0.33+$0.01=$0.34    A:

B's rank/C's quality score=0.75/1=$0.75+$ 0.01=$0.76    C:

minimum cost-per-click=$0.20    B:

In this example, advertiser A would only have to pay $0.34 to hold the first position in the list of advertisements. C would have to pay $0.76 to hold the second position. Advertiser B would be required to pay the minimum cost-per-click amount of $0.20.

The advertisements, associated usage data, and bidding parameters described above can be stored as advertisement data in an advertisement data store 114. An advertiser 102 can further manage the serving of advertisements by specifying an advertising campaign. The advertising campaign can be stored in campaign data in an advertisement data store 114, which can, for example, specify advertising budgets for advertisements, when, where and under what conditions particular advertisements may be served for presentation, etc. For example, a computer company may design an advertising campaign for a new laptop computer that is scheduled to be released on November 20. The advertising campaign may have a budget of $500,000, and may have 30 different advertisements that are to be served for presentation during the month of November. Such data defining the advertisement campaign can be stored in the advertisement data store 114.

§3. Measuring Advertisement Effectiveness

As can be appreciated from the foregoing, the advertising management system 104 permits the serving of advertisements targeted to documents served by the publishers 106 and the search engine 112. Additionally, the usage information and quality factors described above can be used by the advertisement management system 104 to serve higher performing advertisements that are more likely to elicit a response from users of the user devices 108a and 108b.

An advertiser might not be able to anticipate where their advertisement will show on a large publisher network, and the system 104 can help the advertiser adjust keywords, creative, and bid to make sure they appear where they intended, and maximize their return on advertising investment.

The serving of the advertisements, such as the advertisement 118, can be further optimized by evaluating the competitiveness of the maximum cost-per-click, as well as keywords and creative associated with the advertisement. One technique for evaluating the effectiveness of these properties is to determine the content items (e.g., webpages) that an advertisement may be targeted to and providing information to the advertiser 102 about whether the properties associated with the advertisement will allow the advertisement 118 to enter the auction for the webpage and win the auction. Therefore the advertisement will show (i.e., win the auction a significant number of times). Information about performance characteristics (e.g., number of impressions, clicks, and conversions) can also be provided to the advertiser. The advertisement management system 104 may contain a contextual system 116 used in making this determination. In some implementations, similar techniques can be used for advertisements billed by conversion, and impression.

In one implementation, the contextual subsystem 116 can receive an advertisement 118 from an advertiser. The advertisement 118 can include one or more properties. The advertisement 118 can, for example, include keywords that the advertiser wants to use to target the advertisement 118. The advertisement 118 can also include a creative, as well as the maximum CPC the advertiser is willing to pay for the advertisement 118. A creative can include an image and/or lines of text describing the advertisement 118. The advertisement 118 can also be associated with an audience criterion. The audience criterion specifies the audience the advertiser associated with the advertisement 118 wants to see the advertisement 118. For example, an advertiser may specify that the advertisement 118 can only to be shown on Spanish language websites.

In one implementation, the contextual subsystem 116 can extract one or more signals 120, 122, 124 from the advertisement 118. The signal can, for example, include terms associated with the advertisement 118, concepts associated with the advertisement 118, and vertical categories associated with the advertisement 118. The terms can include the keywords submitted by the advertiser. The terms can also be extracted from the text of the creative. In some implementations, the terms can be extracted from the text of the advertisement landing page. The contextual subsystem 116 can extract a concept by analyzing the keywords as well as the creative associated with the advertisement 118, and identify the concept based on the keywords and creative. Each concept includes sets of related words that include the same semantic concept. Concepts are more general than the terms, but are more specific and fine-grained than the broad vertical categories. For example, a concept may include "home run, umpire, short stop, baseball stadium," if the keywords and the creative generally describe baseball. The contextual subsystem 116 can also analyze the keywords and the creative and identify a vertical category associated with the advertisement 118. The vertical category can include a broad category associated with the keywords and the creative. For example, a vertical category can include "sports" if the keyword and the creative are about sports or even about a particular sport such as baseball.

In some implementations, the signals 120, 122, 124 can include landing page text, historical performance associated with the advertisement 118, and historical performance associated with advertisements that are similar to the advertisement 118.

In one implementation, the advertisement data store 114 can store content items (e.g., webpages, publications) associated with the publishers 106. The contextual subsystem 116 can identify a series of the publishers' webpages 126, 128, 130 based on the one or more signals 120, 122, 124 as well as the content of the webpages 126, 128, 130. The contextual subsystem 116 can identify the publisher's webpages 126, 128, 130 by searching for webpages that contain similar signals, i.e., terms, concepts, and vertical categories, as the advertisement 118.

In addition to the content of the webpages associated with the publisher 106, the advertisement data 114 can also store information for each webpage about how high the system 116 scored a semantic relevance of the advertisements that recently entered the auction for that webpage and how well the auction winners performed in the auction on each webpage, as will be described in detail below.

In one implementation, a webpage subsystem 117 can compare the content of the webpages stored in the advertisement data store 114 with the signals 120, 122, 124 of the advertisement 118 and calculate ad-page match scores based on how well each of the webpages match the signals 120, 122, 124 of the advertisement 118. The ad-page match score can indicate a degree of relevance of each of the webpages to the signals 120, 122, 124. In some implementations, the webpage subsystem 117 can calculate the ad-page match scores for a small subset of webpages that appear to have similar signals as the advertisement signals 120, 122, 124.

In some implementations, the webpage subsystem 117 can calculate the ad-page match score based on the degree of relevance. For example, the more relevant the content of the webpages are to the signals, the higher the ad-page rank score. In some implementations, if the content of the webpages are relevant to the signals, the webpage's content can be converted into the same type of term/cluster/vertical category signals as the advertisement 118.

In some implementations, the signals 120, 122, 124 can be weighted for the advertisement 118. The content of the webpages are mapped into the same types of signals as the advertisement signals 120, 122, 124. A direct comparison of webpage signals and the weights may be used to establish relevance.

In some implementations, the webpage subsystem 117 can also use the audience criterion prior to calculating the ad-page match scores. For example, the webpage subsystem may compare the webpages that are associated only with the audience criterion with the signals 120, 122, 124. For example, if the audience criterion is that the advertisement is only to be shown on Spanish language websites, the webpage subsystem 117 will only compare the signals with the webpages that are in Spanish.

In one implementation, the webpage subsystem 117 can rank the webpages based on the scoring. The webpage subsystem 117 can, for example, select a select number of the webpages 126, 128, 130, such as the top ranking scoring webpages.

In one implementation, the webpages 126, 128, 130 are returned as matching webpages only if the ad-page match score of the advertisement 118 compared to the webpages 126, 128, 130 is at least as high as the ad-page match score of other recent advertisements that appeared on the webpages 126, 128, 130. For example, if the lowest ad-page match score of an advertisement that appeared on a webpage 126 is "5," the webpage subsystem 117 will only return webpage 126 as an identified webpage if an advertisement 118 has an ad-page match score when compared to webpage 126 of at least "5."

In one implementation, once the webpages 126, 128, 130 are identified, a prediction subsystem 131 can determine a predicted click-through rate (pCTR) 132 for the advertisement 118 on each of the webpages 126, 128, 130. The pCTR is a prediction of how well the advertisement 118 would perform if the advertisement 118 were to be placed on the webpages 126, 128, 130. The prediction subsystem 131 can analyze previous advertisements placed on the webpages 126, 128, 130 and compare these advertisements to the advertisement 118 and based on the comparison, predict how well the advertisement 118 may perform on each of the webpages 126, 128, 130. In some implementations, the system can consider how similar advertisements have performed across the entire network. Other performance measures such as the relevance metric may also be used.

In one implementation, the contextual subsystem 116 can calculate an auction score 134 based on the pCTR 132 and the maximum CPC associated with the advertisement 118. The auction score 134 represents the score of the advertisement 118 if the advertisement 118 is submitted to the auction for each of the webpage 126, 128, 130. The auction score 134 can help determine whether the advertisement 118, with the current CPC bid, would be eligible to show if participating in the auction for the webpages 126, 128, 130. The contextual subsystem 116 can, for example, calculate the auction score 134 by multiplying the pCTR 132 of each of the webpages 128, 130, 132 by the maximum CPC of the advertisement 118.

In one implementation, the contextual subsystem 116 may generate a report. The report can include the auction score 134 on each of the webpages 126, 128, 130 as well as the auction scores of other advertisements that were previously displayed on the webpages 126, 128, 130. The report can be provided to the advertiser 102 associated with the advertisement 118. The report can show the advertiser the webpages 126, 128, 130 that were identified as potential websites that the advertisement 118 may appear on as well as the auction scores of advertisements on each of the webpages 126, 128, 130. The report may also indicate the auction score of the advertisement 118 on each of the webpages 126, 128, 130. The report can also include information about the number of queries for advertisement 118 on each of the webpage 126, 128, 130 and the fraction of auctions won to indicate number of impressions. The report may also indicate the number of clicks, as determined by the pCTR and the number of impressions. The report may also estimate budget spent on the webpages 126, 128, 130, as determined by the number of clicks of the advertisement 118 and the CPC. The report might include typical values of these metrics for other advertisements that have shown on the webpages 126, 128, 130. The report may also aggregate these metrics into overall metrics and/or by site, domain, or other groupings of pages in addition to or in place of some or all of pages' individual results.

The advertiser can, for example, see that the maximum CPC of the advertiser was not high enough for the auction score of the advertisement 118 to appear on one of the webpages 126, 128, 130. The advertiser 102 may also see that the advertisement's keywords and creative were interpreted by the system in a way that the advertiser 102 did not intend, and that the advertiser 102 needs to add/delete/edit keywords to obtain the desired targeting, or the desired number of impressions, clicks, and conversions. This is explained in detail below.

§4. Example Advertisement

Figure 2:
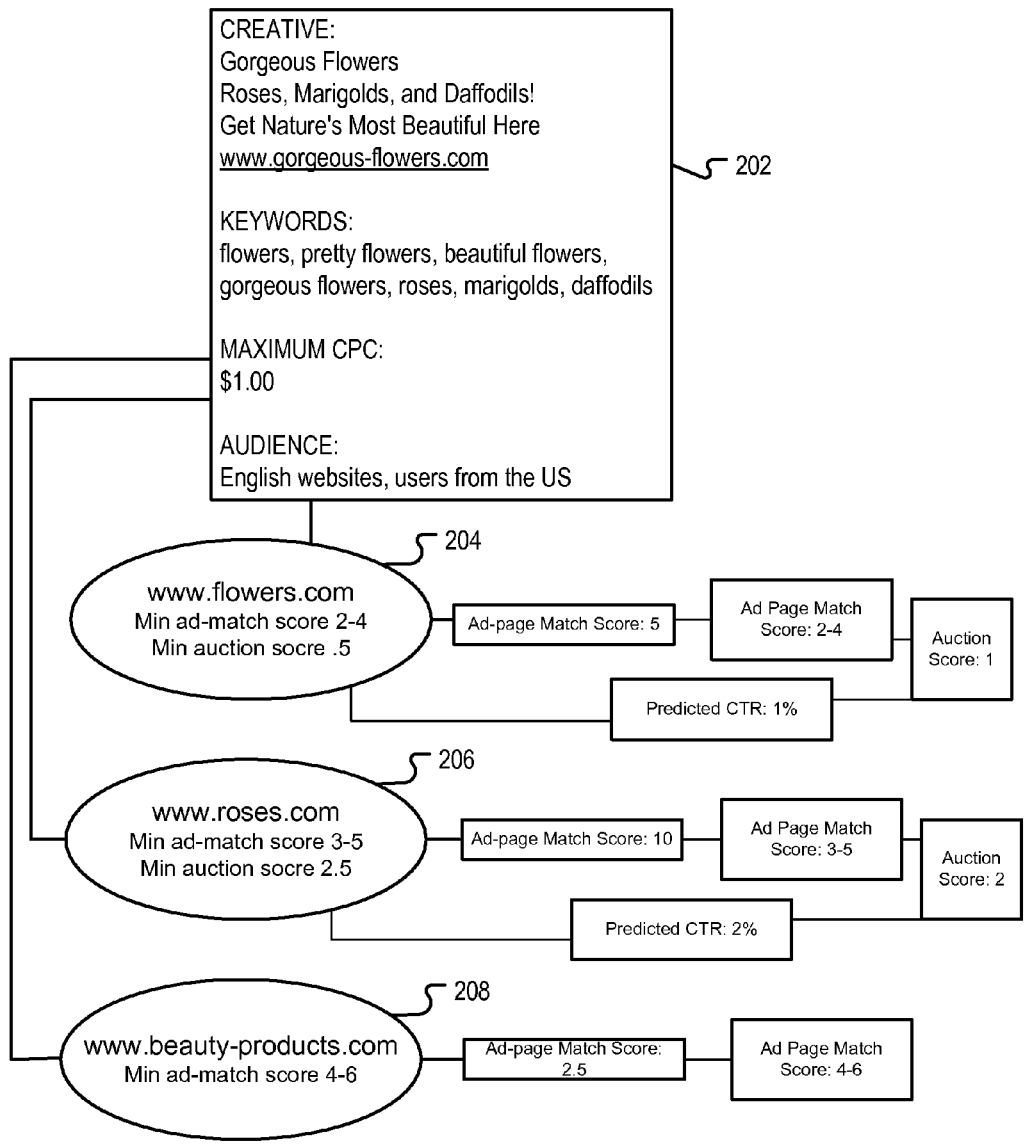
FIG. 2 is an example of an advertisement submitted to determine auction scores associated with the advertisement.

FIG. 2 illustrates an example advertisement 202 that is submitted to the system 104 to determine whether the maximum cost-per-click associated with the advertisement 202 is high enough to return an auction score that will allow the advertisement 202 to win the auction for one or more webpages, as well as to determine the specific webpages where the advertiser will win the auction or the set of webpages where the advertiser may enter the auction but fail to win. In the example of FIG. 2, an advertiser of flowers may submit an advertisement 202 to the advertisement management system 104. The advertisement 202 is associated with a creative "Gorgeous Flowers Roses, Marigolds, and Daffodils! Get nature's most beautiful here! www.gorgeous-flowers.com." The advertiser may also submit the keywords "flowers, pretty flowers, beautiful flowers, gorgeous flowers, roses, marigolds, daffodils." The advertiser also submit a maximum CPC of $1.00, therefore the advertiser is willing to pay a maximum cost-per-click amount of $1.00 for each click on the advertisement 202. The advertiser also indicates that the advertisement 202 should only appear on English webpages shown to users in the United States.

The contextual subsystem 116 can submit the audience criterion of the advertisement, e.g., English webpages, users from the United States with to the webpage subsystem 117 to identify webpages that meet the audience criterion. Once the webpages that meet the audience criterion are determined, the contextual subsystem can extract signals from the advertisement 202. The contextual subsystem 116 can, for example, extract terms, a concept, and a vertical category from the keywords and the text associated with the advertisement 202. The contextual subsystem 116 can submit the signals to the webpage subsystem 117 to identify webpages on which the advertisement 202 may appear. The webpage subsystem 117 can compare the signals to the publisher's webpages previously identified as matching the audience criterion in the advertisement data store 114 and determine an ad-page match score for the webpages and the advertisement 202.

In some implementations, ad-page match scores are calculated for a small subset of all the webpages in the advertisement data store 114. For example, the webpages that have signals that are similar to the signals of the advertisement 202.

In this example, the webpage subsystem 117 identified three webpages, www.flowers.com 204, www.roses.com 206, and www.beauty-products.com 208 as the highest ranked pages according to the ad-page match scores. The webpage subsystem 117 calculated ad-page match scores of 5.0 for www.flowers.com 204, 10.0 for www.roses.com 206, and 2.5 for www.beauty-products.com 208 for the gorgeous-flowers.com advertisement 202. The webpage subsystem 117 can then compare the three ad-page match scores calculated for each of the webpages 204, 206, 208 against a cumulative distribution of past matching scores to determine what fraction of each of the webpage's 204, 206, 208 auctions the gorgeous-flowers.com advertisement 202 is expected to enter.

The contextual subsystem 116 determines for all the auctions ran for www.flowers.com 204, the worst-targeted advertisements had ad-page match scores between 2.0 and 4.0. For www.roses.com 206, the worst-targeted advertisements had ad-page match scores between 3.0 to 5.0, and for www.beauty-products.com 208 the worst-targeted advertisements had ad-page match scores between 4.0 to 6.0.

The www.gorgeous-flowers.com advertisement 202 had an ad-page match score of 5.0 on www.flowers.com 204, so it could potentially enter all of www.flowers.com's auctions because the range of the worst-targeted advertisements on www.flowers.com 204 was between 2.0 and 4.0, and 5.0 is higher than this range, so www.flowers.com 204 is returned as a matching page. This is also true for www.roses.com 206 because the range of the worst-targeted advertisements on www.roses.com 206 was between 3.0-5.0, and the ad-page match score 10 of the advertisement 202 is higher than this range, so www.roses.com 206 is returned as a matching page. However, on www.beauty-products.com 208, the advertisement was targeted with an ad-page match score of only 2.5, while the worst-targeted advertisement that entered an auction on www.beauty-products.com 208 had a score of 4.0. The contextual subsystem 116 can determine that the gorgeous-flowers.com advertisement 202 does not match the content of www.beauty-products.com 208 as well as the advertisements we have typically auctioned there, and therefore that it won't enter www.beauty-product.com's advertisements auction. Therefore, www.beauty-products.com 208 is not returned as a matching webpage, even though it had superficially similar content to the input advertisement 202 and matched the initial query.

At this point, the contextual subsystem 116 has established that the gorgeous-flowers.com advertisement 202 can enter the auction for www.flowers.com 204 and www.roses.com 206. The contextual subsystem 116 can then determine whether the advertisement 202 can win the auction on either of these sites. The contextual subsystem 116 uses a prediction subsystem 131 to find predicted click-through rates for the advertisement 202 on www.flowers.com 204 and www.roses.com 206, and combines those click-throughs with the advertisement 202's bid to obtain an auction score for the advertisement 202 on each of the pages www.flowers.com 204 and www.roses.com 206.

Suppose the prediction subsystem 131 predicts that the advertisement 202 will be clicked 1% of the time it runs on www.flowers.com 204 and 2% of the time that the advertisement 202 runs on www.roses.com 206. The contextual subsystem 116 can calculate the auction score according to the formula:

$$\text{Auction\_score} = pCTR * \text{maximum CPC}$$

Where pCTR is the predicted click-through rate and the maximum CPC is the maximum bid the advertiser of 202 is willing to pay for a click on the advertisement 202. The auction scores can therefore be calculated as:

$$(\$1\ bid * 1\%\ pCTR) = \text{auction score of 1.0 for www.flowers.com 204}$$

$$(\$1\ bid * 2\%\ pCTR) = \text{auction score of 2.0 for www.roses.com 206}$$

The contextual subsystem 114 can keep distributions of the minimum auction score that is needed to win the auction in the same way that it kept distributions of minimum ad-page match scores that are needed to enter each auction. If, for example, the worst advertisement in all auctions on www.flowers.com 204 always had an auction score of at least 0.5 and the worse advertisement in all auctions on www.roses.com 206 always had an auction score of at least 2.5, then even though the advertisement 202 has a higher auction score on www.roses.com (auction score 2) than it does on www.flowers.com (auction score of 1), only on www.flowers.com 204 can the new advertisement 202 ever win the auction and display on the webpage. Therefore, the contextual subsystem 116 can determine that the advertisement 202 will only display on www.flowers.com 204. The contextual subsystem 116 can, for example, generate a report with the information that the advertisement 202 will win the auction on www.flowers.com 204 and not on www.roses.com 206, and return it to the advertiser of the advertisement 202. The advertiser can then determine that in order to enter the auction on www.roses.com 206, the advertiser may need to raise the maximum CPC from $1.00 to win the auction on www.roses.com 206.

§6. Example Advertisement Effectiveness Processes

Figure 3:
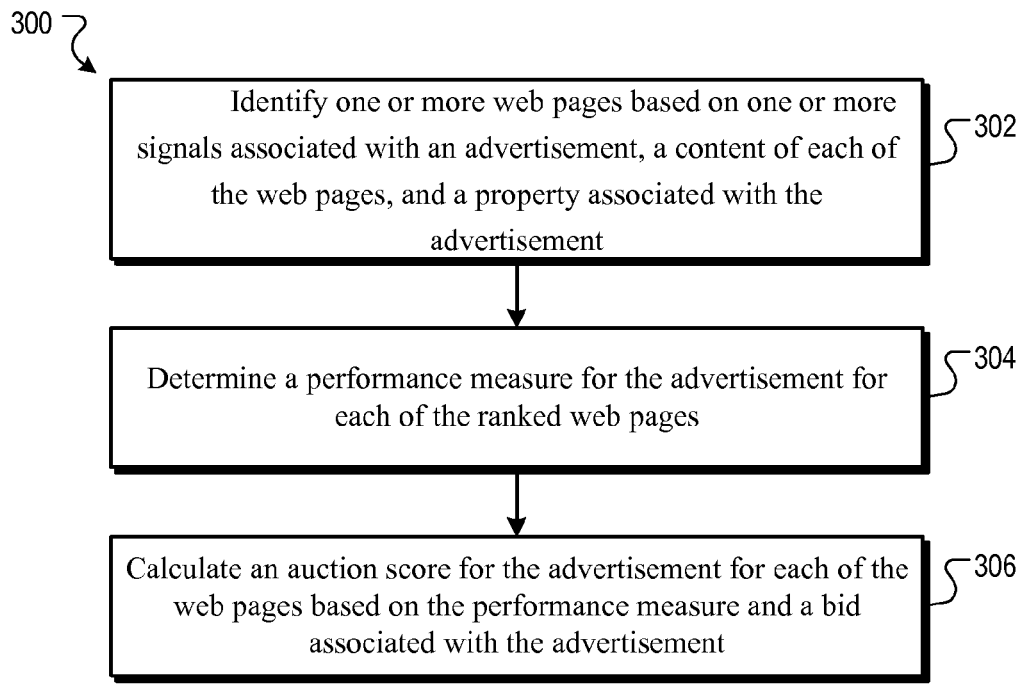
FIG. 3 is a flow diagram of an example process for calculating an auction score for a content item on one or more webpages.

FIG. 3 is a flow diagram of an example process 300 for calculating auction scores for an advertisement. The process 300 can, for example, be implemented in the advertisement management system 104 of FIG. 1, or in some other hardware and software computing device.

The process 300 identifies one or more first content items (e.g., webpages) based on one or more signals associated with a second content item (e.g., advertisement) and a content of each of the content items (302) For example, the contextual subsystem 116 can identify one or more webpages based on one or more signals associated with an advertisement and a content of each of the webpages. The signals can, for example, include a concept associated with the second content item, terms associated with the second content item, and a category associated with the second content item.

The process 300 determines a performance measure for the first content item for each of the first content items (e.g., webpages) (304). For example, the prediction subsystem 131 can determine a performance measure, such as a predicted click-through rate, for the advertisement for each of the webpages.

The process 300 calculates an auction score for the second content item for each of the first content items based on the performance measure and a bid associated with the second content item (306). For example, the contextual subsystem 116 can calculate an auction score for the advertisement for each of the webpages based on the performance measure and a bid associated with the advertisement.

Figure 4:
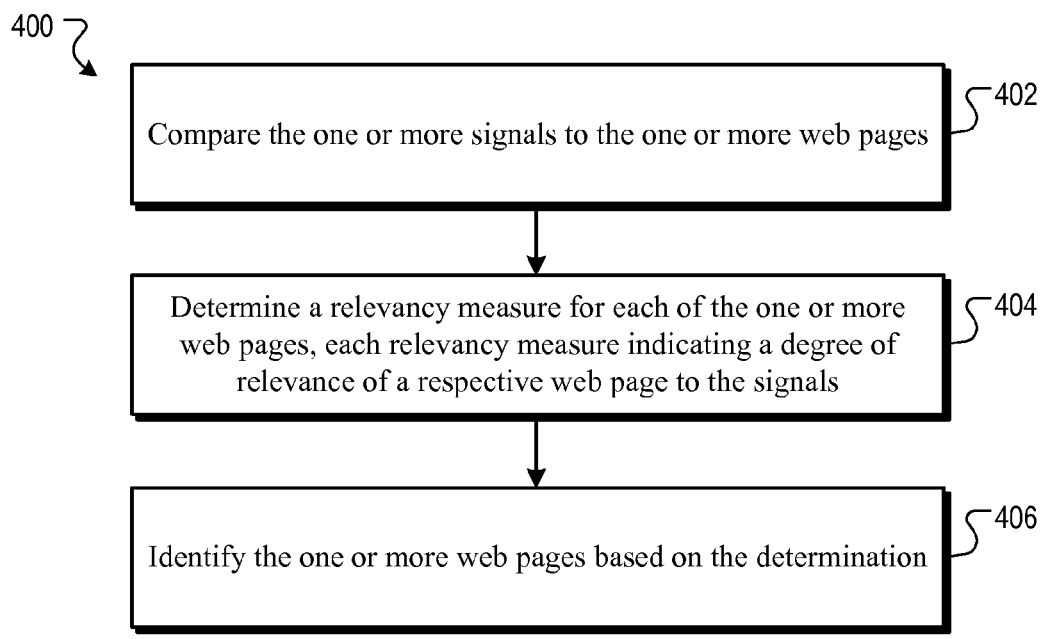
FIG. 4 is a flow diagram of an example process for identifying one or more webpages based on one or more signals associated with the content item.

FIG. 4 is a flow diagram of an example process 400 for identifying one or more first content items (e.g., webpages) based on one or more signals associated with a second content item (e.g., advertisement). The process 400 can, for example, be implemented in the advertisement management system 104 of FIG. 1, or in some other hardware and software computing device.

The process 400 compares the one or more signals to the one or more first content items (402). For example, the webpage subsystem 117 can compare the one or more signals to the one or more webpages. In some implementations, the webpage subsystem 117 can compare an audience criterion with the webpages and identify the webpages that match the audience criterion. Then the webpage subsystem 117 can compare the one or more signals to the identified webpages.

The process 400 determines a relevancy measure for each of the one or more first content items, each relevancy measure indicating a degree of relevance of a respective first content item to the signals (404). For example, the webpage subsystem 117 can determine a relevancy measure for each of the one or more webpages, each relevancy measure indicating a degree of relevance of a respective webpage to the signals. The relevancy measure can, for example, include an ad-page match score.

The process 400 identifies the one or more first content items based on the determination (406). For example, the webpage subsystem 117 can identify the one or more webpages based on the determination.

Figure 5:
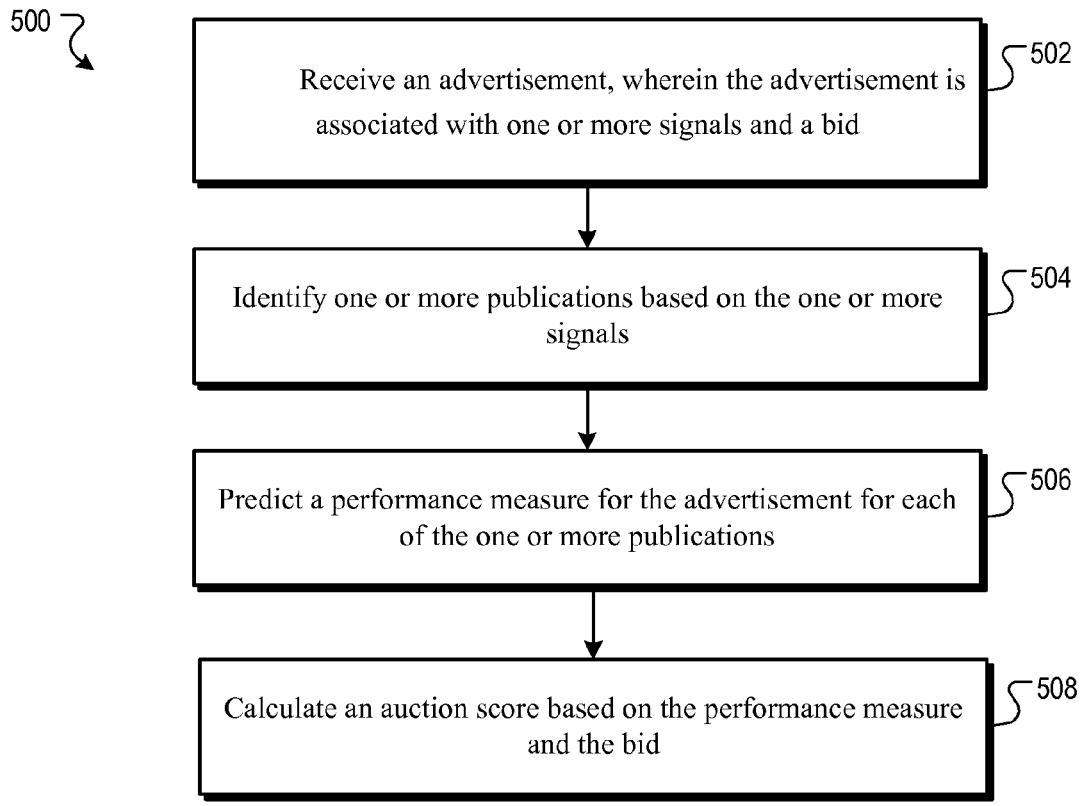
FIG. 5 is a flow diagram of another example process for calculating an auction score for a content item on one or more webpages.

FIG. 5 is a flow diagram of an example process 500 for calculating auction scores for the second content item (e.g., advertisement). The process 500 can, for example, be implemented in the advertisement management system 104 of FIG. 1, or in some other hardware and software computing device.

The process 500 receives a second content item, wherein the second content item is associated with one or more signals and a bid (502). For example, the contextual subsystem 116 can receive an advertisement, wherein the advertisement is associated with one or more signals and a bid. The advertisement can also be associated with an audience criterion.

The process 500 identifies one or more first content items based on the one or more signals (504). For example, the webpage subsystem 117 can identify one or more publications based on the one or more signals. The webpage subsystem 117 can identify the publications based on the signals as well as the audience criterion.

The process 500 predicts a performance measure for the second content item for each of the one or more first content items (506). For example, the prediction subsystem 131 can predict a performance measure for the advertisement for each of the one or more publications.

The process 500 calculates an auction score based on the performance measure and the bid (508). For example, the contextual subsystem 116 can calculate an auction score based on the performance measure and the bid.

Figure 6:
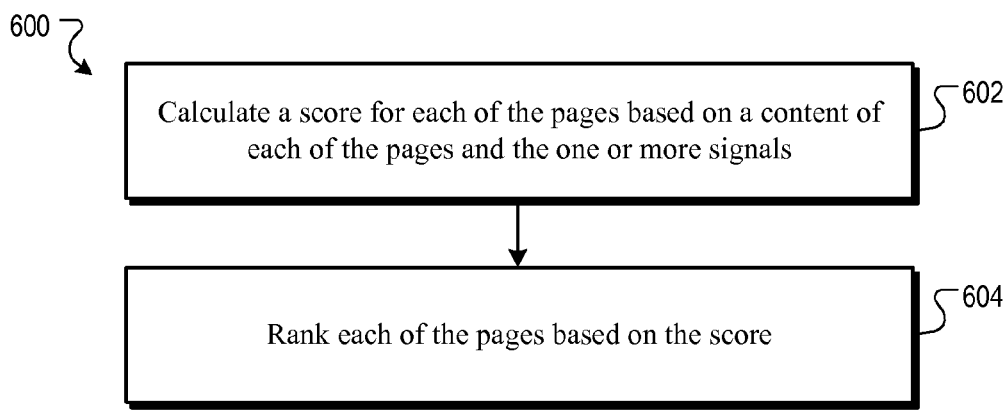
FIG. 6 is a flow diagram of an example process for calculating a match score and ranking the webpages.

FIG. 6 is a flow diagram of an example process 600 for calculating a match score and ranking the first content items. The process 600 can, for example, be implemented in the advertisement management system 104 of FIG. 1, or in some other hardware and software computing device.

The process 600 calculates a score for each of the first content items based on a content of each of the first content items and the one or more signals (602). For example, the web page subsystem 117 can calculate a score for each of the webpages based on a content of each of the webpages and the one or more signals associated with advertisement. The score can, for example, include an ad-page match score.

The process 600 ranks each of the first content items based on the score (604). For example, the webpage subsystem 117 can rank each of the webpages based on the score.

The contextual subsystem 116, the webpage subsystem 117, and the prediction subsystem 131 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The contextual subsystem 116, the webpage subsystem 117, and the prediction subsystem 131 can be implemented separately, or can be implemented as a single software entity. The contextual subsystem 116, the webpage subsystem 117, and the prediction subsystem 131 can also be distributively implemented over a network, such as a server farm, or can be implemented in a single computer device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
receiving, by a computer system, an advertisement and a maximum payment associated with the advertisement;
identifying, by the computer system, one or more webpages based on one or more signals associated with the advertisement, and on content of each of the webpages;
determining, by the computer system, a predicted placement of the advertisement on each webpage of the one or more webpages;
wherein determining the predicted placement comprises, for each webpage:
determining a predicted click through rate for the advertisement and the webpage, the predicted click through rate predicting how the advertisement would perform on the webpage,
calculating an auction score for the advertisement for the webpage based on the maximum payment and the predicted click-through rate,
comparing the auction score to a historic auction score received from an advertising management system in data communication with the computer system, the historic auction score representative of the minimum auction score required to win an auction for the webpage and determining, based on the comparison, whether the auction score for the advertisement exceeds the minimum auction score required to win an auction for the webpage; and
generating, by the computer system, a report comprising predicted placements on web pages for which the auction score for the advertisement is determined to exceed the minimum auction score required to win an auction for the webpage.

2. The method of claim 1, wherein the one or more signals include one or more of text of a creative associated with the advertisement, keywords, an objective audience indicator, category identifiers, concept identifiers, landing page text, historical performance associated with the advertisement, and historical performance associated with similar advertisements.

3. The method of claim 1, wherein identifying one or more webpages based on one or more signals associated with an advertisement and a content of each of the webpages comprises:
comparing the one or more signals to the one or more webpages;
determining a relevancy measure for each of the one or more webpages, each relevancy measure indicating a degree of relevance of a respective webpage to the signals; and
identifying the one or more webpages based on the determination.

4. The method of claim 3, wherein identifying the one or more webpages based on the determination comprises:
scoring each of the webpages based on the relevancy measure; and
ranking the webpages based on the scoring.

5. The method of claim 1, wherein calculating an auction score for the advertisement for each of the webpages based on the performance measure and a bid associated with the advertisement comprises:
calculating the auction score for each webpage based on the predicted click-through rate of the advertisement and the bid.

6. The method of claim 1, wherein the report includes the auction score for each of the one or more webpages based on the advertisement and the auction score for each of the one or more webpages based on other advertisements that have appeared on each of the webpages.

7. A system, comprising:
one or more computers and one or more storage devices storing instructions that are operable, when executed by the one or more computers, to cause the one or more computers to perform operations comprising:
receiving an advertisement and a maximum payment associated with the advertisement;
identifying one or more webpages based on one or more signals associated with the advertisement, and on content of each of the webpages;
determining a predicted placement of the advertisement on each webpage of the one or more webpages;
wherein determining the predicted placement comprises, for each webpage:
determining a predicted click through rate for the advertisement and the webpage, the predicted click through rate predicting how the advertisement would perform on the webpage,
calculating an auction score for the advertisement for the webpage based on the maximum payment and the predicted click-through rate, and
comparing the auction score to a historic auction score received from an advertising management system in data communication with the one or more computers, the historic auction score representative of the minimum auction score required to win an auction for the webpage and determining, based on the comparison, whether the auction score for the advertisement exceeds the minimum auction score required to win an auction for the webpage; and
generating, by the computer system, a report comprising predicted placements on web pages for which the auction score for the advertisement is determined to exceed the minimum auction score required to win an auction for the webpage.

8. The system of claim 7, wherein the one or more signals include one or more of text of a creative associated with the advertisement, keywords, an objective audience indicator, a category identifier, and a concept identifier.

9. The system of claim 8, wherein the processor is further operable to perform operations comprising:
comparing the one or more signals to the one or more webpages;
determining a relevancy measure for each of the one or more webpages, each relevancy measure indicating a degree of relevance of a respective webpage to the signals; and
identifying the one or more webpages based on the determination.

10. The system of claim 9, wherein the processor is further operable to perform operations comprising:
scoring each of the webpages based on the relevancy measure; and
ranking the webpages based on the scoring.

11. A non-transitory computer storage medium encoded with computer program instructions that when executed by one or more computers cause the one or more computers to perform operations comprising:

receiving an advertisement and a maximum payment associated with the advertisement;
identifying one or more webpages based on one or more signals associated with an the advertisement, and on content of each of the webpages;
determining a predicted placement of the advertisement on each webpage of the one or more webpages;
wherein determining the predicted placement comprises, for each webpage:
  determining a predicted click through rate for the advertisement and the webpage, the predicted click through rate predicting how the advertisement would perform on the webpage,
  calculating an auction score for the advertisement for the webpage based on the maximum payment and the predicted click-through rate, and
  comparing the auction score to a historic auction score received from an advertising management system in data communication with the one or more computers, the historic auction score representative of the minimum auction score required to win an auction for the webpage and determining, based on the comparison, whether the auction score for the advertisement exceeds the minimum auction score required to win an auction for the webpage; and
generating, by the computer system, a report comprising predicted placements on web pages for which the auction score for the advertisement is determined to exceed the minimum auction score required to win an auction for the webpage.

* * * * *

UNITED STATES PATENT AND TRADEMARK OFFICE
CERTIFICATE OF CORRECTION

PATENT NO. : 8,635,103 B1
APPLICATION NO. : 12/046200
DATED : January 21, 2014
INVENTOR(S) : Gregory S. West, Leon Chih Wen Wong and Matthew C. Cary It is certified that error appears in the above-identified patent and that said Letters Patent is hereby corrected as shown below:

In the Claims

Claim 11, Column 17, Line 4 – after "with" delete "an".

Signed and Sealed this
Twentieth Day of May, 2014

Michelle K. Lee
*Deputy Director of the United States Patent and Trademark Office*